Jan. 28, 1958    J. C. CORDORA ET AL    2,821,092
CONTROL SYSTEM AND CONDUIT CABLE
Filed Aug. 16, 1956
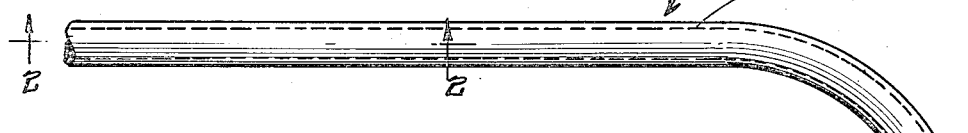
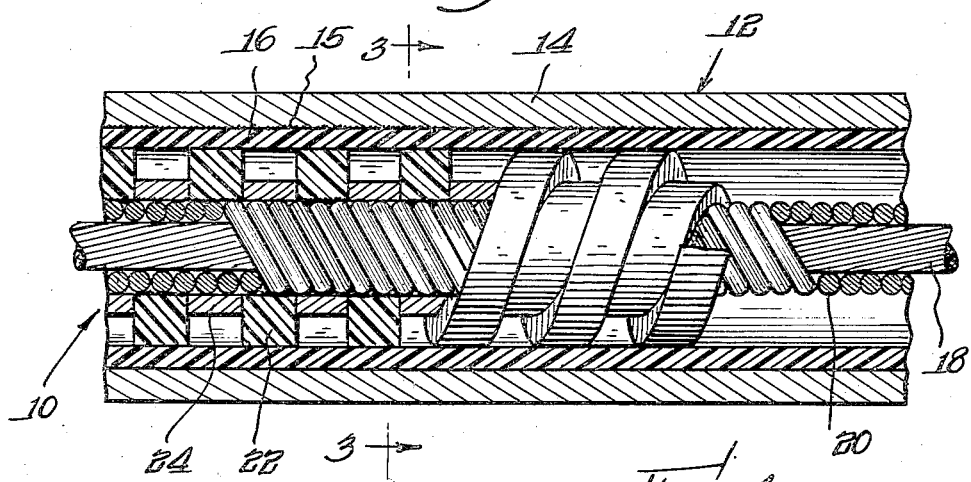
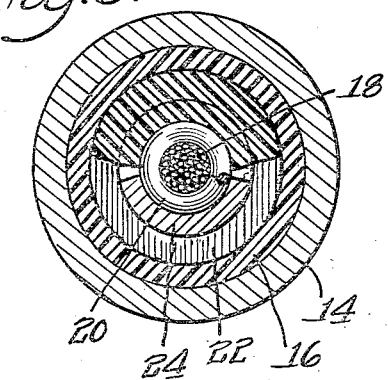
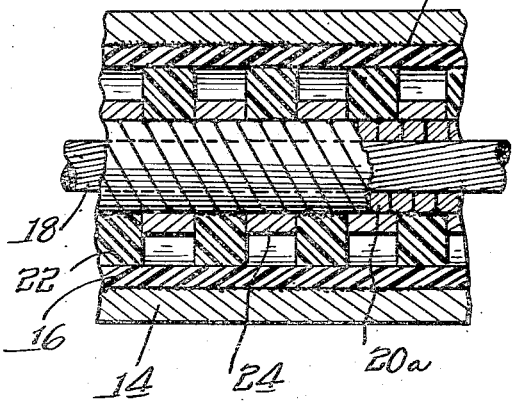
INVENTORS
Joseph Charles Cordora
Thomas Francis Carlin
By: Olson & Trexler attys.

United States Patent Office 2,821,092
Patented Jan. 28, 1958

2,821,092

CONTROL SYSTEM AND CONDUIT CABLE

Joseph C. Cordora, North Wales, and Thomas Francis Carlin, Philadelphia, Pa., assignors to Teleflex Incorporated, North Wales, Pa., a corporation of Delaware Application August 16, 1956, Serial No. 604,559

6 Claims. (Cl. 74—501)

The present invention relates to a novel control system and, more particularly, to a novel control or actuating system of the type utilizing a flexible actuating cable slidably or rotatably disposed within a guide conduit.

Control systems of the general type contemplated herein which have heretofore been in general use frequently cause relatively high power losses and may be subject to unduly rapid wear as a result of friction between the cable and the guide conduit. Many suggestions have been made of various structures which purport to reduce friction between the cable and the conduit, but such suggested structures have often been too complicated or expensive or otherwise not completely satisfactory.

An important object of the present invention is to provide a control system utilizing a novel cable structure and/or a novel conduit structure which are constructed so as substantially to reduce friction losses and wear and which may be used in combination with each other and also effectively used in combination with standard cables or conduits.

A further object of the present invention is to provide novel flexible power transmission cables and novel rigid guide conduits therefor which are constructed so as to minimize friction losses and wear and which, at the same time, are of a construction similar to standard parts heretofore in general use so as to minimize production costs and to enable the novel parts to be installed in known control systems.

A further and more specific object of the present invention is to provide novel flexible power transmission cables and rigid guide conduits of the above described type having incorporated therein bearing elements formed from tetrafluoro polyethylene which is commercially available under the name of "Teflon."

Fig. 1 is a fragmentary elevational view showing a portion of a control system incorporating features of the present invention;

Fig. 2 is an enlarged fragmentary view partially in cross section along line 2—2 in Fig. 1;

Fig. 3 is a cross sectional view taken along line 3—3 in Fig. 2; and

Fig. 4 is a fragmentary sectional view showing a slightly modified form of the present invention.

Referring now more specifically to the drawings wherein like parts are designated by the same numerals throughout the various figures, a system incorporating the features of the present invention includes a flexible power transmission cable 10 rotatably and/or slidably disposed within a rigid guide conduit structure 12. The conduit structure 12 comprises a strong and rigid outer conduit 14 formed of various metals or other suitable materials, which outer conduit is lined with a tubular liner member 16 formed from Teflon. The liner is bonded at 15 to the interior surface of the conduit 14 and, if, for example, the conduit 14 is formed from aluminum, a heat pressure bond may be used while in the event the conduit 14 is formed from steel, stainless steel, inconel and the like, an epoxy resin bonding agent is used.

The cable 10 includes a central core 18 adapted to accommodate tension stresses and formed from a plurality of wires helically wound together with a relatively great lead angle. A wire 20 is reversely wound around the central core 18 with a relatively small lead angle for accommodating compressive stresses which may be applied to the cable. In accordance with a feature of this invention, a relatively large wire 22 having a rectangular cross section and formed from Teflon is helically wound with spaced coils around the wire 20. The Teflon wire is bonded to the wire 20 in much the same manner as the liner 16 is bonded to the conduit 14 so that the Teflon wire and the inner metallic wires of the cable structure will move as a unit. Thus, the cable structure may be actuated in a known manner by meshing an actuating gearlike member, not shown, with the helical projections provided by the Teflon wire. In order further to insure the maintenance of the desired spacing between the coils of the Teflon wire, a relatively flat wire 24 preferably formed from metal is wound between the coils of the Teflon wire in the manner shown. While the wire 20 to which the Teflon wire is bonded is shown as having a circular cross section in Fig. 2, in many instances it is desirable to provide this wire with a rectangular cross section indicated by the wire 20a in Fig. 4 so as to increase the surface area to which the Teflon wire is bonded.

The conduit structure and flexible cable described above may be used in combination with each other in the manner shown, or alternatively, the conduit may be used with presently commercially available cable not including helically wound Teflon wire and similarly, the novel cable structure 10 may be used with presently available unlined metallic conduits. It has been found that when either the novel conduit structure or the novel cable structure or both are used in a control system, the control system will have substantially less friction losses or, in other words, will be substantially more efficient than generally similar heretofore proposed control systems not using either the Teflon liner in the conduit or the Teflon wire on the cable. A control system including a guide conduit having a Teflon liner constructed in accordance with the present invention and a heretofore commercially available flexible cable without the above described Teflon wire is up to about 20% more efficient than the similar system utilizing an unlined steel conduit. The substantially improved results have been obtained by the use of a structure described above even though first tests indicated that the plastic or Teflon liner member and wire would not provide satisfactory results since the Teflon shredded relatively rapidly apparently as a result of high bearing pressures exerted on the Teflon. However, it has been found that by initially lubricating the surfaces of the Teflon elements with a thin coating of grease or the like, shredding of the Teflon is substantially minimized or eliminated and the above mentioned improved results or increased efficiency is obtained as compared with a similarly lubricated control system of heretofore known construction. The above described Teflon liner member and wire may be formed from substantially pure Teflon which maintains its low co-efficient of friction property and is capable of providing a long cycle life and high efficiency through a wide temperature range. Thus, control systems utilizing the teachings of the present invention may be successfully operated when subjected to temperatures from minus 100° Fahrenheit to plus 500° Fahrenheit. It has also been found that the wear resistance and cycle life of the Teflon elements may be increased by using a Teflon-based compound incorporating a filler, the object of which is to enhance the mechanical properties of the resin, i. e., resistance to deformation under load, resistance to wear, stiffness, thermal conductivity, compressive strength, hardness, etc.

While the preferred embodiment of the present invention has been shown and described herein, it is obvious that many structural details may be changed without departing from the spirit and scope of the appended claims.

The invention is claimed as follows:

1. A control system of the type described comprising a guide conduit, a tetrafluoro polyethylene tubular liner member disposed within and bonded to said conduit, and a flexible load transmitting cable shiftably disposed within said liner member, said cable including a wire core for accommodating tension forces, a metallic wire coil around said core for accommodating compression forces, a tetrafluoro polyethylene wire helically wound with spaced coils around said metallic wire coil, said tetrafluoro polyethylene wire having a cross sectional area substantially greater than a cross sectional area of said metallic wire and having an inner surface substantially flat in cross section and bonded to said metallic wire, said tetrafluoro polyethylene wire having an outer surface substantially flat in cross section so that the spaced coils thereof provide spaced bearing surfaces engageable with said liner member, and spacing wire means of substantially less radial extent than said tetrafluoro polyethylene wire wound on said metallic wire coil between coils of said tetrafluoro polyethylene wire for maintaining said last mentioned coils in spaced relationship.

2. In a system of the type described, a guide conduit structure for a flexible cable comprising a rigid conduit, and a tetrafluoro polyethylene tubular liner member disposed within and bonded to said conduit and providing a bearing for reducing friction losses when a cable is shifted within the conduit structure.

3. A conduit structure, as defined in claim 2, wherein said conduit is formed of metal, and said liner member is formed of a tetrafluoro polyethylene based compound including a filler.

4. In a control system of the type described, a flexible load transmitting cable adapted to be shifted within a guide conduit structure, said cable including a central core comprising a plurality of small wires for accommodating tension forces, a metallic wire helically wound with a relatively small lead angle and with abutting coils around said core for accommodating compression forces, a tetrafluoro polyethylene wire having spaced coils around said metallic wire and reversely helically wound with respect to said metallic wire, said tetrafluoro polyethylene wire having a relatively large cross sectional area as compared with a cross sectional of said metallic wire and having an inner surface substantially flat in cross section bonded to said metallic wire and an outer bearing surface substantially flat in cross section for slidably engaging a guide conduit structure when the cable is shifted within a guide conduit structure, and spacing wire means having a radial extent substantially less than the radial extent of said tetrafluoro polyethylene wire and wound on said metallic wire between coils of said tetrafluoro polyethylene wire for maintaining said last mentioned coils in spaced relationship.

5. A cable, as defined in claim 4, wherein said metallic wire has a substantially rectangular cross section for providing an outer surface thereof substantially flat in cross section for facilitating bonding of said tetrafluoro polyethylene wire thereto.

6. A cable, as defined in claim 4, wherein said tetrafluoro polyethylene wire is compounded with a filler.

References Cited in the file of this patent

UNITED STATES PATENTS

| | | |
|---|---|---|
| 1,882,943 | Ross | Oct. 18, 1932 |
| 2,388,241 | Arens | Nov. 6, 1945 |
| 2,519,812 | Arens | Aug. 22, 1950 |
| 2,787,917 | Schroeder | Apr. 9, 1957 |

FOREIGN PATENTS

| | | |
|---|---|---|
| 548,934 | Great Britain | Oct. 29, 1942 |

OTHER REFERENCES

S. A. E. Journal, page 104 Sept. 1956 74–501 (vol. 64 #10).

Electronics, p. 225 March 1952 74–501.